(12) United States Patent
Osawa (10) Patent No.: US 7,116,464 B2
(45) Date of Patent: Oct. 3, 2006

(54) REFLECTIVE COLOR DISPLAY ELEMENT, METHOD OF MANUFACTURE THEREOF, AND INFORMATION DISPLAY APPARATUS EMPLOYING SAME

(75) Inventor: Atsushi Osawa, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 89 days.

(21) Appl. No.: 11/028,547

(22) Filed: Jan. 5, 2005

(65) Prior Publication Data

US 2006/0001946 A1    Jan. 5, 2006

(30) Foreign Application Priority Data

Jan. 7, 2004    (JP) .............................. 2004-001540

(51) Int. Cl.
*G02B 26/00*    (2006.01)
(52) U.S. Cl. ...................... 359/291; 359/290; 359/223; 359/224
(58) Field of Classification Search ................ 359/290, 359/291, 223, 224, 238, 298
See application file for complete search history.

(56) References Cited

FOREIGN PATENT DOCUMENTS

JP    5-281479 A    10/1993

OTHER PUBLICATIONS

"Manufacture and Commercialization of MEMS Based Displays", M. Miles, 2003 EDEC Conference, New Displays in Development, pp. 1-10—1-14, Apr. 9, 2003.

*Primary Examiner*—Timothy Thompson
(74) *Attorney, Agent, or Firm*—Sughrue Mion, PLLC (57) ABSTRACT

A reflective color display element having high reflectance, and which is capable of displaying a plurality of colors, is provided. The reflective color display element is constituted by: a lamellate structure that expands and contracts by the application of voltage thereto; and a voltage applying means, for applying voltage to the lamellate structure at both ends in the expansion/contraction direction thereof. The color exhibited by the lamellate structure is varied by adjusting the voltage applied to the lamellate structure, thereby causing the lamellate structure to expand and contract. This causes interference wavelengths of light incident on the lamellate structure, having a component in the expansion/contraction direction, within the lamellate structure to be varied.

6 Claims, 7 Drawing Sheets

WHITE
FIG.8A

RED
FIG.8B

REFLECTIVE COLOR DISPLAY ELEMENT, METHOD OF MANUFACTURE THEREOF, AND INFORMATION DISPLAY APPARATUS EMPLOYING SAME

BACKGROUND OF THE INVENTION

1. Field of the Invention

The present invention relates to a reflective color display element that utilizes multilayer film interference. The present invention also relates to a method for manufacturing such a reflective color display element. The present invention further relates to an information display apparatus that employs the reflective color display element.

2. Description of the Related Art

The definition of "structural color" is not clearly defined. Commonly, the term "structural color" refers to all color phenomena derived from the fact that properties of light differ according to their wavelengths. "Structural color" differs from pigment colors which are normally perceived as "color", in that "structural color" originates from the wavelike properties of light.

Specific examples of structural colors are: thin film interference, such as that by soap bubbles; multilayer film interference, such as that by laser mirror reflectors; dispersion effect, which is the reason why the sky is blue; and refraction effects, such as dispersion of colors by prisms. Interference appears particularly often in the natural world, because interference conspicuously increases the light intensity of specific colors.

Presently, some displays have been proposed that employ interference as the color emitting principle thereof, as disclosed in Japanese Unexamined Patent Publication No. 5 (1993)-281479, and "Manufacture and Commercialization of MEMS Based Displays" M. Miles, 2003 EDEC Conference, New Displays in Development (Apr. 9, 2003).

However, in the method disclosed by M. Miles, the color (wavelength), which is reproducible at a pixel, is fixed, and full color reproduction is difficult. The display disclosed in Japanese Unexamined Patent Publication No. 5(1993)-281479, pluralities of colors are capable of being displayed, by varying the distance between interference layers of display elements. However, because the display elements utilize interference effects of single layers, the reflectance is low.

SUMMARY OF THE INVENTION

The present invention has been developed in view of the foregoing circumstances, and it is an object of the present invention to provide a reflective color display element having high reflectance, and which is capable of displaying a plurality of colors. It is another object of the present invention to provide a method for manufacturing such a reflective color display element. Still another object of the present invention is to provide an information display apparatus, equipped with reflective color display elements having high reflectance, and which are capable of displaying pluralities of colors.

The first reflective color display element of the present invention comprises:

a lamellate structure, formed by a piezoelectric material that expands and contracts by the application of voltage thereto; and a voltage applying means, for applying voltage to the lamellate structure at both ends in the expansion/contraction direction thereof; wherein the color exhibited by the lamellate structure is varied by adjusting the voltage applied to the lamellate structure, thereby causing the lamellate structure to expand and contract, by which interference wavelengths of light incident on the lamellate structure, having a component in the expansion/contraction direction, within the lamellate structure is varied.

The second reflective color display element of the present invention comprises a lamellate structure, formed by a photosensitive resist material; and a filler portion, formed by a piezoelectric material that expands and contracts by the application of voltage thereto, which is embedded between the walls and in the periphery of the lamellate structure; wherein the color exhibited by the lamellate structure is varied by adjusting the voltage applied to the filler portion, thereby causing the lamellate structure to expand and contract, by which interference wavelengths of light incident on the lamellate structure, having a component in the expansion/contraction direction, within the lamellate structure is varied.

Here the term "light" includes infrared light and ultraviolet light, in addition to visible light.

The term "lamellate structure" refers to walled structure, similar to the gills found under the cap of a mushroom.

The method for manufacturing the first reflective color display element of the present invention comprises the steps of:

irradiating exposure light in a substantially vertical direction onto a photosensitive resist film, which is provided on a reflective surface of a substrate, to generate standing waves of the exposure light between the surface of the resist film and the reflective surface, thereby exposing the interior of the resist film with the exposure light;

developing the photosensitive resist film, to form lamellate structures from the exposed portion or portions that are not exposed; and providing means for applying voltage to both ends of the lamellate structures in their expansion/contraction direction.

The method for manufacturing the second reflective color display element of the present invention comprises the steps of:

irradiating exposure light in a substantially vertical direction onto a photosensitive resist film, which is provided on a reflective surface of a substrate, to generate standing waves of the exposure light between the surface of the resist film and the reflective surface, thereby exposing the interior of the resist film with the exposure light;

developing the photosensitive resist film, to form lamellate structures from the exposed portion or portions that are not exposed;

embedding piezoelectric material between the walls and in the peripheries of the lamellate structures; and providing means for applying voltage to both ends of the lamellate structures in their expansion/contraction direction.

The information display apparatus of the present invention comprises:

a display portion, constituted by a great number of the first or second reflective color display elements of the present invention; and drive means, for driving each of the elements so that a plurality of adjacent elements constitute a single pixel.

The first and second reflective color display elements of the present invention controls the thicknesses and the intervals between walls of the lamellate structure, which are multilayer films employed for light interference, by varying the voltage applied thereto. Therefore, the color exhibited by the lamellate structure is changed as desired, that is, a plurality of colors may be displayed as desired.

In addition, because the display elements employ multi-layer interference, the reflectance is higher than that of single layer interference display elements. Further, the necessity of a polarizing plate, which is utilized for LCD display elements and simple diffusion white display elements, is obviated. Therefore, the high reflectance can be maintained.

The methods for manufacturing the first and second reflective color display elements of the present invention utilize standing waves, which are generated within the photosensitive resist thin film when exposed. Therefore, formation of lamellate structures having desired wall thicknesses and intervals between walls is facilitated.

The information display apparatus of the present invention comprises a great number of the first or second reflective color display elements of the present invention. Pluralities of the reflective color display elements, each of which are capable of displaying various colors, constitute individual pixels in the information display apparatus. Therefore, the same color can be displayed by all of the elements that constitute a single pixel.

Figure 11A:
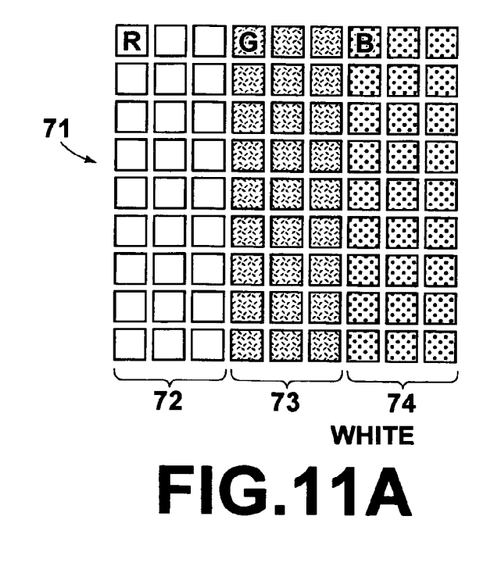
FIGS. 11A and 11B illustrate a single pixel region of a conventional information display apparatus.
Figure 11B:
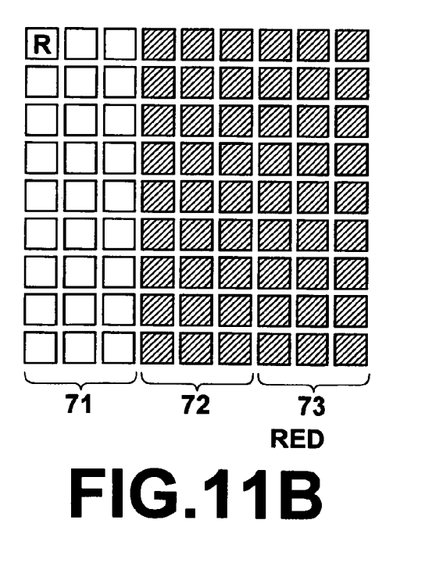

As illustrated in FIGS. 11A and 11B, conventional information display apparatuses had individual pixels 71 constituted by a red region 72, a green region 73, and a blue region 74. The red region 72 is constituted by display elements that are only capable of displaying red, the green region 73 is constituted by display elements that are only capable of displaying green, and the blue region 74 is constituted by display elements that are only capable of displaying blue. This is because conventional display elements are only capable of displaying a single color. Accordingly, in the case that white is to be displayed, red, green, and blue are displayed at the red, green, and blue regions, respectively, as illustrated in FIG. 11A. In the case that red is to be displayed, only the red region perform display, while the other regions are kept black. Therefore, even though the display is supposed to be red, the displayed red color is dark. The same applies to cases in which green or blue are displayed.

However, according to the information display apparatus of the present invention, each of the display elements is capable of displaying any desired color. Therefore, for example, all of the plurality of display elements that constitute an individual pixel can display red, in the case that red is to be displayed. Accordingly, color display, which is more vibrant compared to conventional display apparatuses, is enabled.

DESCRIPTION OF THE PREFERRED EMBODIMENTS

Hereinafter, embodiments of the present invention will be described in detail, with reference to the attached drawings.

Figure 1A:
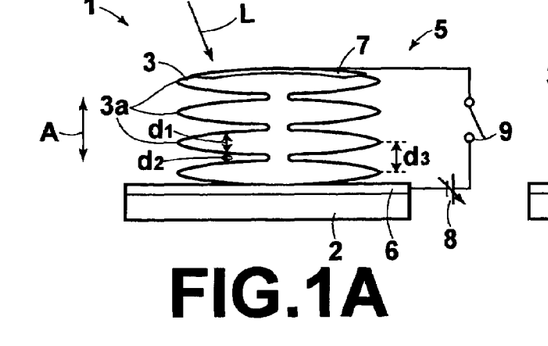
FIGS. 1A and 1B are sectional model diagrams of a reflective color display element according to a first embodiment of the present invention.
Figure 1B:
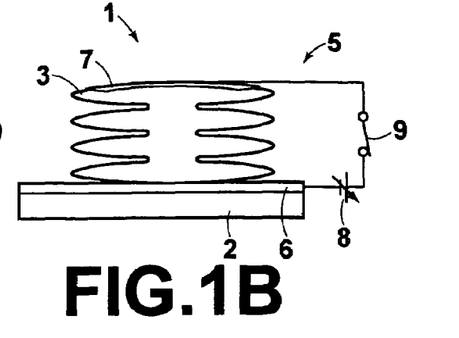

FIGS. 1A and 1B are sectional model diagrams of a reflective color display element 1 according to a first embodiment of the present invention. The reflective color display element 1 comprises: a lamellate structure 3, which is formed by a piezoelectric material that expands and contracts by the application of voltage thereto, provided on a substrate 2; and a voltage applying means 5, for applying voltage to both ends of the lamellate structure 3 in the expansion/contraction direction A thereof. The voltage applying means 5 comprises: electrodes 6 and 7, which are respectively provided at the two ends of the lamellate structure 3 in the expansion/contraction direction A; a variable power source 8, capable of adjusting the applied voltage; and a switch 9. The lamellate structure 3 extends in the depth direction of the drawing sheet of FIGS. 1A and 1B. The shape of the lamellate structure 3 when viewed in the expansion/contraction direction A may be any desired shape, such as rectangular, square, circular, or polygonal, according to the intended use thereof.

The lamellate structure 3 comprises: a layered portion, which are in the form of the gills beneath the cap of a mushroom; and a ridge portion that extends through the center of the layered portion so as to connect individual layers 3a (walls). The walls 3a are formed such that their thicknesses and the intervals therebetween have uniform periodicity. Note that when the thickness of each wall 3a is designated as $d_1$ and each interval between the walls 3a is designated as $d_2$, the period $d_3$ of the walls 3a is $d_3=d_1+d_2$. At this time, the thickness $d_1$ and the intervals $d_2$ are mean values of the thicknesses and the intervals. The thicknesses $d_1$ of the walls 3a, the intervals $d_2$ therebetween, and the period $d_3$ thereof are changed when voltage is applied to the two ends of the lamellate structure. Voltage is applied to the two ends of the lamellate structure 3 by the switch 9 being switched from the open position illustrated in FIG. 1A to the closed position illustrated in FIG. 1B. Here, when voltage is applied, the lamellate structure 3 contracts, causing the thicknesses of the walls 3a, the intervals therebetween, and the period thereof to decrease, as illustrated in FIG. 1B. Note that the thicknesses of the walls 3a, the intervals therebetween, and the period thereof can be changed, by varying the voltage applied to the two ends of the lamellate structure 3 by the variable power source 8.

Light L, which is incident on the lamellate structure 3 and has a component in the expansion/contraction direction A, is reflected and interfere at the walls 3a and at the air layers between the walls. The color exhibited by the lamellate structure 3 is different from that of the light L, due to the interference wavelength within the lamellate structure 3. That is, the interference wavelength of the light L is variable by changing the voltage applied to the lamellate structure 3, thereby varying the thicknesses of the walls 3a, the intervals therebetween, and the period thereof. Therefore, the color exhibited by the lamellate structure 3 is changed.

The wavelength λ of the color exhibited by the lamellate structure 3 due to interference can be expressed by the following equation, in which the refractive index of the material that forms the lamellate structure 3 is designated as n, and it is assumed that the periphery thereof is a vacuum or air.

$$2(nd_1 + d_2) = m\frac{\lambda}{2}$$

$$\therefore \lambda = \frac{4(nd_1 + d_2)}{m}, \text{ wherein } (m = 1, 2, \ldots)$$

Here, if $d_3 = d_1 + d_2$ is set so that λ=350 nm (m=1), which is in the ultraviolet range, the interference wavelength would be 700 nm, which is not visible to the human eye. Therefore, the color black is enabled to be displayed.

Note that the material of the lamellate structure 3 is a piezoelectric material, as described above.

Specific examples of piezoelectric polymers to be employed as the material of the lamellate structure 3 are listed in Table 1. Ferroelectric polymers and ceramic polymer compounds have particularly high piezoelectric moduli. Polyvinylidene difluoride is particularly well suited as the material.

TABLE 1

| Class | Substance | Piezoelectric Modulus (pC/N) |
|---|---|---|
| Polar Polymers | polyvinyl chloride; polyacrylo nitrile; polyvinylidene difluoride nylon 11; vinylidene cyanide-vinyl acetate copolymer | d31 < 3 |
| Ferroelectric Polymers | Polyvinylidene difluoride; vinylidene fluoride-3vinyl fluoride copolymer; vinylidene fluoride-4 vinyl fluoride copolymer | d31 < 40 |
| Ceramic-Polymer Compounds | Polyvinylidene difluoride/PZT; polyacetal/PZT; rubber/PZT | d31 < 40 |

Note that the material of the lamellate structure in the reflective color display element of the first embodiment, which 5 is produced by a manufacturing method to be described later, is photosensitive in addition to being piezoelectric. This type of material can be achieved, by designing and synthesizing photosensitive polymers such that the molecular structure thereof is symmetrical about an ∞ axis and a plane of symmetry parallel thereto, or $C_{\infty v}$. Alternatively, this type of material can be obtained by dispersing piezoelectric ceramic powder, such as lead zirconate titanate, within a photosensitive polymer.

Next, a method for manufacturing the reflective color display element according to the first embodiment of the present invention will be described.

Generally, if patterning is performed on a photosensitive resist, coated at a thickness which is an integer multiple of a half wavelength of exposure light, the exposure light generates standing waves within the resist. Thereby, waves of exposure strength are generated at portions within the resist. It is known that these exposure strength waves form photosensitive patterns, such as lamellate structures, in the direction perpendicular to the plane of the thin film of resist. In this manner, the lamellate structures are easily produced, by utilizing the standing waves, which are generated within thin films of photosensitive resist, as in photolithography methods.

FIGS. 2A, 2B, 2C, and 2D are diagrams that illustrate the manufacturing steps of the reflective color display element according to the first embodiment of the present invention.

Figure 2A:
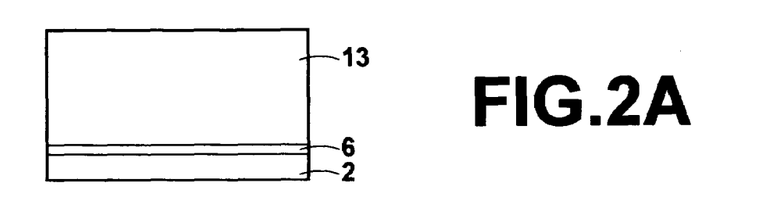
FIGS. 2A, 2B, 2C, and 2D are diagrams that illustrate the manufacturing steps of the reflective color display element according to the first embodiment of the present invention.

First, as illustrated in FIG. 2A, an electrode 6 is formed on the substrate 2. The electrode 6 is formed by sputtering or the like, and the surface thereof functions as a reflective surface. Next, a thin film 13 of photosensitive resist is formed on the electrode 6. The thickness of the thin film 13 is an integer multiple of a half wavelength of exposure light. The thickness is determined such that standing waves are generated between the surface of the thin film 13 and the surface of the electrode 6, which is a reflective surface, when irradiated with exposure light.

Figure 2B:
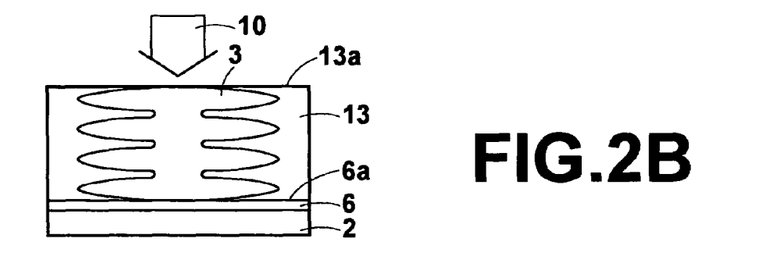

Next, as illustrated in FIG. 2B, exposure light 10 is irradiated. The exposure light 10 is caused to enter the thin film 13 in a direction substantially perpendicular to the substrate 2. When the exposure light 10 is irradiated, standing waves are generated between a surface 13a of the thin film 13 and a surface 6a of the electrode 6. Thereby, a lamellate exposed portion 3 is formed within the thin film 13 of photosensitive resist.

Figure 2C:
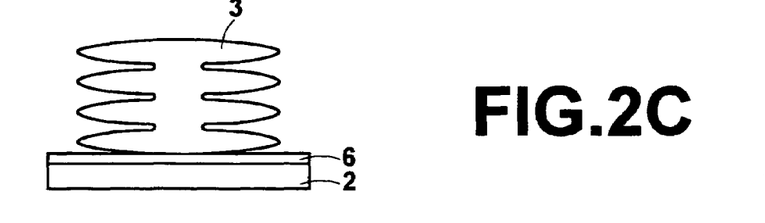

Thereafter, a developing process is performed, to form the lamellate structure 3 illustrated in FIG. 2C.

Figure 2D:
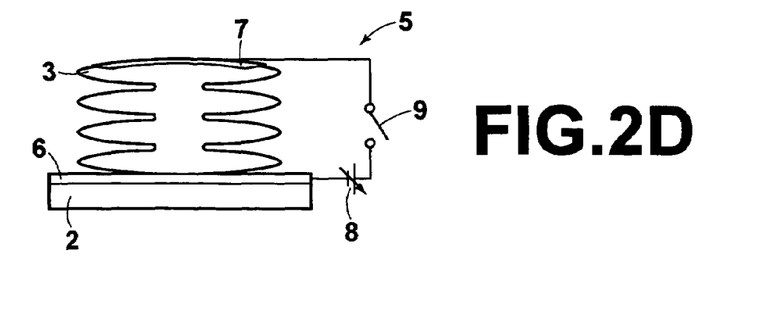

Further, the electrode 7 is formed on the upper surface of the lamellate structure 3 in its expansion/contraction direction, and connected to the variable power source 8 and the switch 9, thereby forming the voltage applying means 5, as illustrated in FIG. 2D. Thereby, the reflective color display element is completed.

Figure 3A:
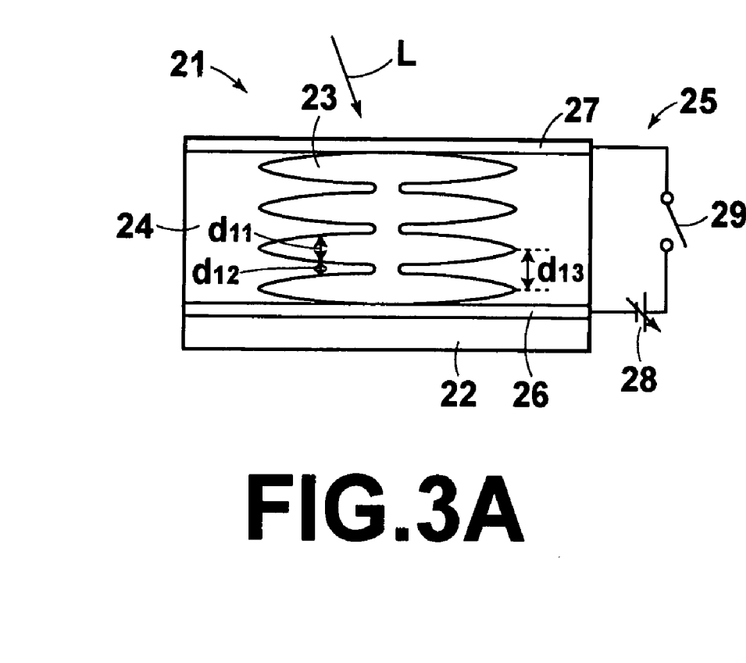
FIGS. 3A and 3B are sectional model diagrams of a reflective color display element according to a second embodiment of the present invention.
Figure 3B:
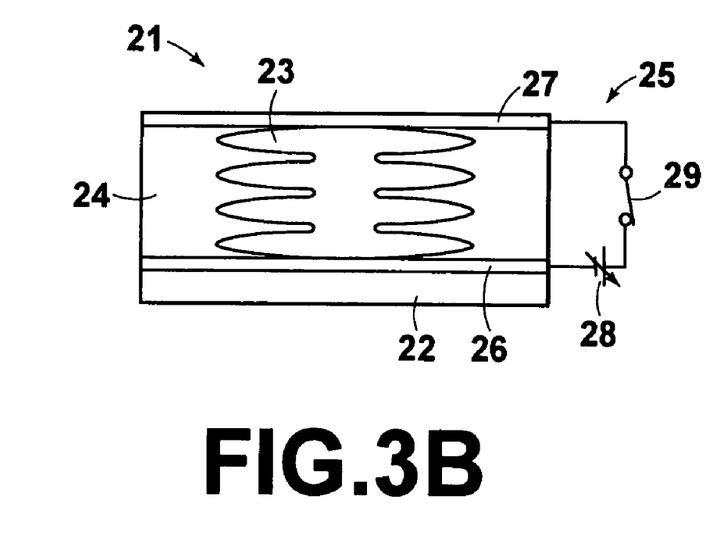

FIGS. 3A and 3B are sectional model diagrams of a reflective color display element 21 according to a second embodiment of the present invention. The reflective color display element 21 comprises: a lamellate structure 23, which is formed by photosensitive resist material, provided on a substrate 22; a filler portion 24 embedded between walls 23a and the periphery of the lamellate structure 21, which is formed by a piezoelectric material that expands and contracts by the application of voltage thereto; and a voltage applying means 25, for applying voltage to both ends of the filler portion 24 in the expansion/contraction direction A thereof. The voltage applying means 25 comprises: electrodes 26 and 27, which are respectively provided at the two ends of the filler portion 24 in the expansion/contraction direction A; a variable power source 28, capable of adjusting the applied voltage; and a switch 29. The lamellate structure 23 extends in the depth direction of the drawing sheet of FIGS. 3A and 3B, similar to the lamellate structure 3 of the first embodiment. The shape of the lamellate structure 23 when viewed in the expansion/contraction direction A may be any desired shape, such as rectangular, square, circular, or polygonal, according to the intended use thereof.

The lamellate structure 23 comprises: a layered portion, which are in the form of the gills beneath the cap of a mushroom; and a ridge portion that extends through the center of the layered portion so as to connect individual layers 23a (walls). The walls 23a are formed such that their thicknesses and the intervals therebetween have uniform periodicity. The lamellate structure 23 is caused to expand and contract by expansion and contraction of the filler portion 24, which is formed by a piezoelectric material that expands and contracts when voltage is applied to the two ends thereof. When the thickness of each wall 23a is designated as $d_{11}$ and each interval between the walls 23a is designated as $d_{12}$, the period $d_{13}$ of the walls 23a is $d_{13}=d_{11}+d_{12}$. When voltage is applied to the two ends of the filler portion 24, the filler portion 24 expands and contracts. At this time, the lamellate structure 23 expands and contracts along with the filler portion 24, thereby changing the thicknesses $d_{11}$ of the walls 23a, the intervals $d_{12}$ therebetween, and the period $d_{13}$ thereof. Voltage is applied to the two ends of the filler portion 24 by the switch 29 being switched from the open position illustrated in FIG. 3A to the closed position illustrated in FIG. 3B. Here, when voltage is applied, the filler portion 24 and therefore the lamellate structure 23 contracts, causing the thicknesses of the walls 23a, the intervals therebetween, and the period thereof to decrease, as illustrated in FIG. 3B. Note that the thicknesses of the walls 23a, the intervals therebetween, and the period thereof can be changed, by varying the voltage applied to the two ends of the filler portion 24 by the variable power source 28.

Light L, which is incident on the lamellate structure 23 and has a component in the expansion/contraction direction A, is reflected by and interfere at the walls 23a and at the air layers between the walls. The color exhibited by the lamellate structure 23 is different from that of the light L, due to the interference wavelength within the lamellate structure 23. That is, the interference wavelength of the light L is variable by changing the voltage applied to the filler portion 24, thereby varying the thicknesses of the walls 23a, the intervals therebetween, and the period thereof. Thereby, the color exhibited by the lamellate structure 23 is changed.

The wavelength λ of the color exhibited by the lamellate structure 23 due to interference can be expressed by the following equation, in which the refractive index of the photosensitive resist that forms the lamellate structure 23 is designated as $n_1$, and the refractive index of the piezoelectric material that forms the filler portion 24 is designated as $n_2$.

$$2(n_1 d_{11} + n_2 d_{12}) = m\frac{\lambda}{2}$$

$$\therefore \lambda = \frac{4(n_1 d_{11} + n_2 d_{12})}{m}, \text{ wherein } (m = 1, 2, \ldots)$$

The materials listed in Table 1, for example, may be employed as the piezoelectric material of the filler portion 24.

Next, a method for manufacturing the reflective color display element according to the second embodiment of the present invention will be described.

FIGS. 4A, 4B, 4C, 4D, and 4E are diagrams that illustrate the manufacturing steps of the reflective color display element according to the second embodiment of the present invention.

Figure 4A:
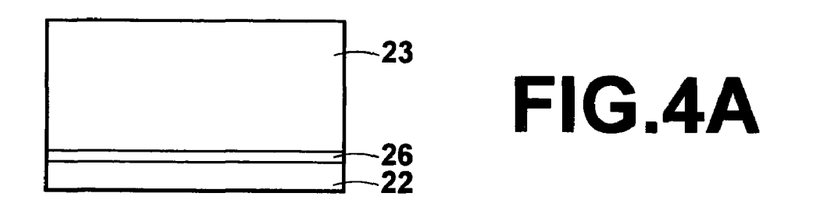
FIGS. 4A, 4B, 4C, 4D, and 4E are diagrams that illustrate the manufacturing steps of the reflective color display element according to the second embodiment of the present invention.

First, as illustrated in FIG. 4A, an electrode 26 is formed on the substrate 22. The electrode 26 is formed by sputtering or the like, and the surface thereof functions as a reflective surface. Next, a thin film 33 of photosensitive resist is formed on the electrode 26. The thickness of the thin film 33 is an integer multiple of a half wavelength of exposure light. The thickness is determined such that standing waves are generated between the surface of the thin film 33 and the surface of the electrode 26, which is a reflective surface, when irradiated with exposure light.

Figure 4B:
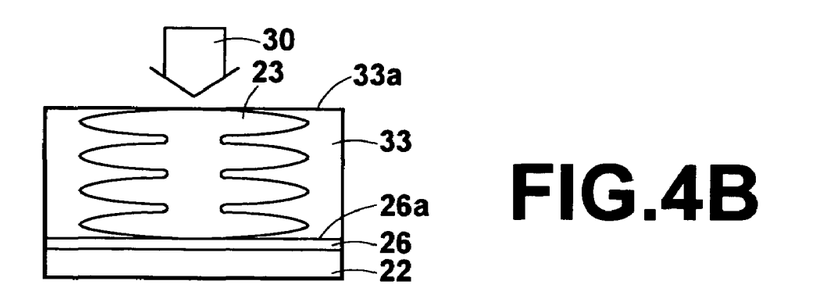
Figure 4C:
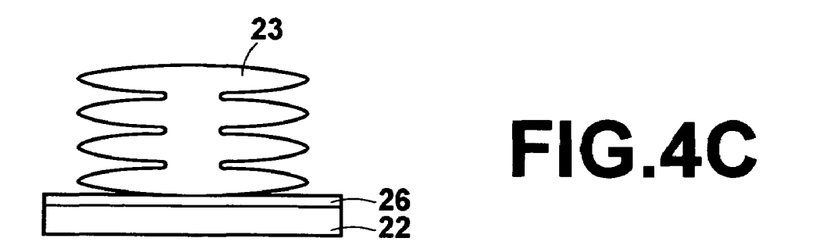

Next, as illustrated in FIG. 4B, exposure light 30 is irradiated. The exposure light 30 is caused to enter the thin film 33 in a direction substantially perpendicular to the substrate 22. When the exposure light 30 is irradiated, standing waves are generated between a surface 33a of the thin film 33 and a surface 26a of the electrode 26. Thereby, a lamellate exposed portion 23 is formed within the thin film 33 of photosensitive resist.

Thereafter, a developing process is performed, to form the lamellate structure 23 illustrated in FIG. 2C.

Figure 4D:
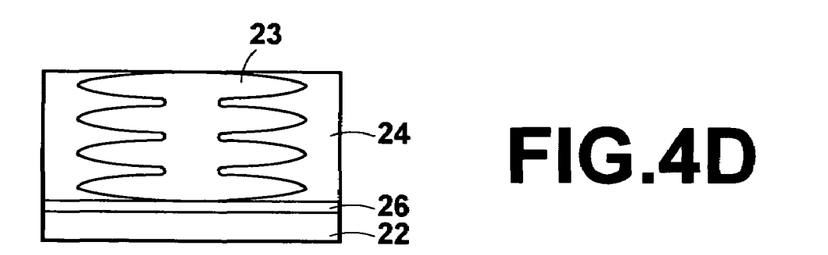

Next, the spaces between the walls 23a of the lamellate structure 23 and the periphery thereof are filled with piezoelectric material to form the filler portion 24, as illustrated in FIG. 4D.

Figure 4E:
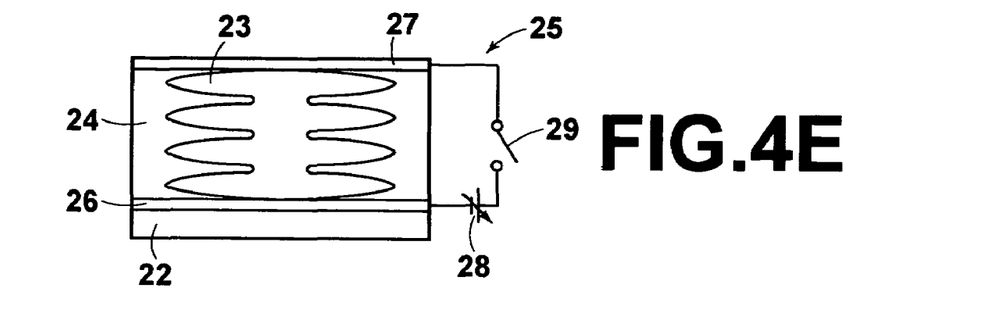

Further, the electrode 27 is formed on the upper surface of the lamellate structure 23 in its expansion/contraction direction, and connected to the variable power source 28 and the switch 29, thereby forming the voltage applying means 25, as illustrated in FIG. 4E. Thereby, the reflective color display element is completed.

Note that the descriptions of the manufacturing method for the reflective color display element according to the first and second embodiments assume that the photosensitive resist employed therein are of the positive type. Alternatively, it is possible to employ a negative type photosensitive resist. In these cases, the lamellate structure is formed by unexposed portions of the photosensitive resist.

Figure 5:
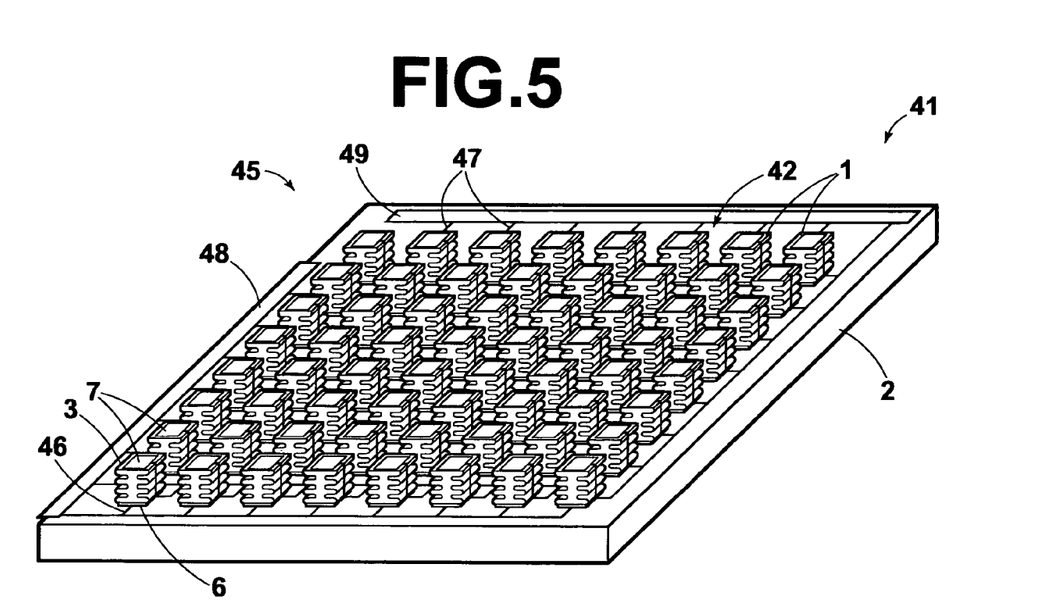
FIG. 5 is a schematic structural diagram of the information display apparatus according to a first embodiment of the present invention.

Next, an information display apparatus 41 according to a first embodiment will be described with reference to FIG. 5. FIG. 5 is a schematic structural diagram of the information display apparatus 41.

The information display apparatus 41 illustrated in FIG. 5 comprises: a display portion 42, which is constituted by a great number of the reflective color display elements 1 of FIG. 1 arranged in a matrix; and drive means 45 for individually driving each of the elements 1. Note that the elements 1 are all formed on a common substrate 2, and configured such that the voltage applying means of each element 1 is driven individually. That is, word lines 46 and bit lines 47 are provided with respect to the electrodes 6 and 7. The word lines 46 are connected to a word line driver 48, and the bit lines 47 are connected to a bit line driver 49. Note that voltage can be applied to each of the elements without crosstalk, by providing switches (not shown), such as at least one TFT (Thin Film Transistor), for each element. Accordingly, the elements 1 of the information display apparatus 41 are driven individually, and are capable of being controlled such that each displays a desired color.

Figure 6A:
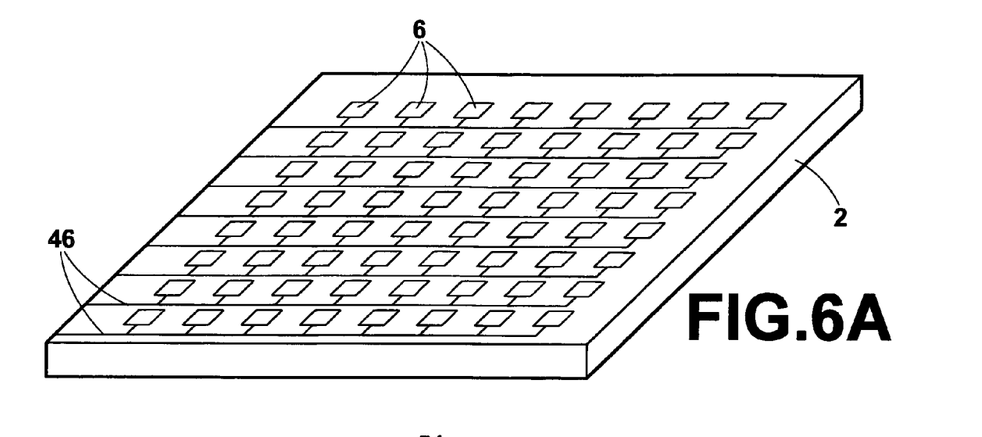
FIGS. 6A, 6B, and 6C are diagrams that illustrate the manufacturing steps of the information display apparatus according to the first embodiment.
Figure 6B:
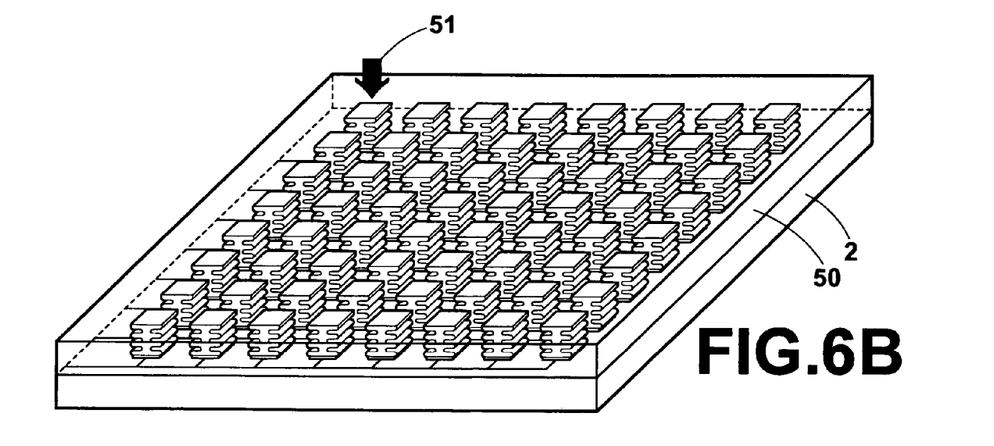
Figure 6C:
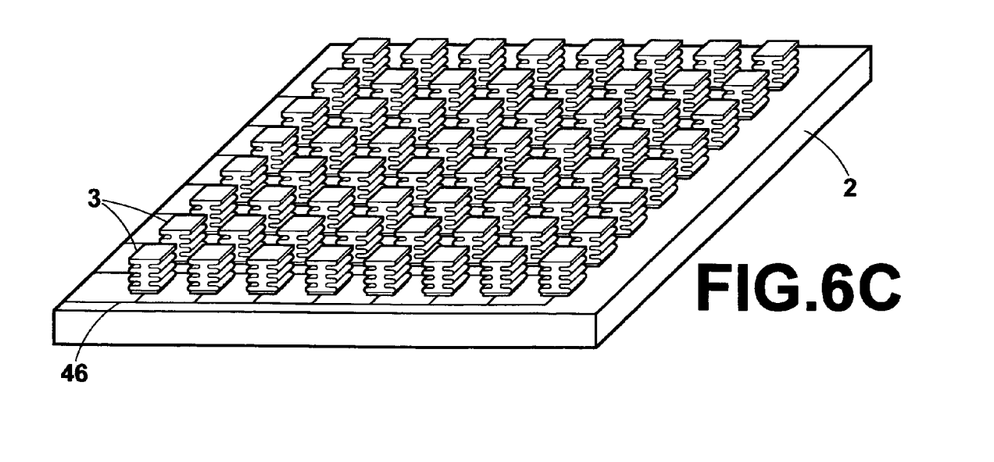
Figure 7A:
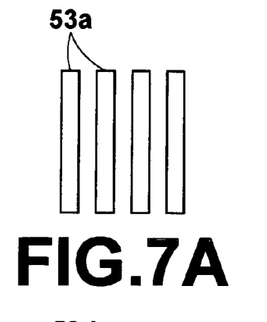
FIGS. 7A, 7B, 7C, 7D, 7E, 7F, and 7G show examples of shapes of the upper surfaces of lamellate structures, and arrangement patterns thereof.
Figure 7B:
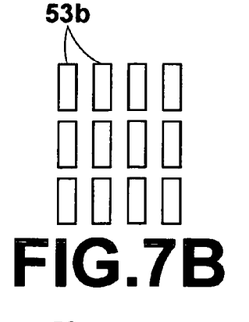
Figure 7C:
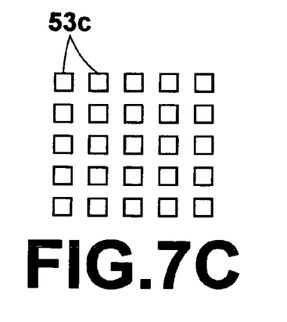
Figure 7D:
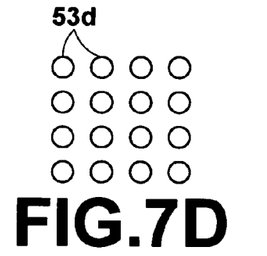
Figure 7E:
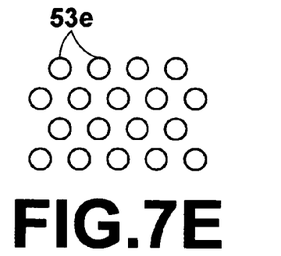
Figure 7F:
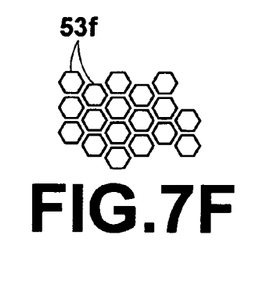
Figure 7G:
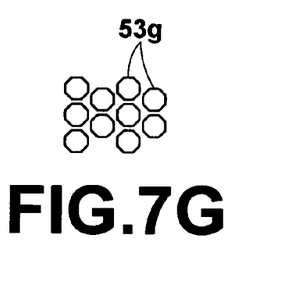

A method for manufacturing the information display apparatus 41 of FIG. 5 will be described with reference to FIGS. 6A, 6B, and 6C. FIGS. 6A, 6B, and 6C are diagrams that illustrate the manufacturing steps of the information display apparatus 41.

First, a mask, which is patterned as electrodes and word lines, is formed, and the electrodes 6 and the word lines 46 are formed by sputtering or the like (refer to FIG. 6A). Next, a thin film 50 of photosensitive resist is formed on the electrodes 6 and the word lines 46, and a desired pattern in exposed (refer to FIG. 6B). Here, exposure light 51 is irradiated on rectangular regions corresponding to the arrangement of the electrodes 6, which are arranged in a matrix. The exposure light 51 is caused to enter each of the rectangular regions in a direction substantially perpendicular to the substrate 2. Thereby, standing waves are generated within the thin film 50 of photosensitive resist, and the interior of the thin film 50 of photosensitive resist is exposed in a lamellar pattern.

A plurality of lamellate structures 3, which are arranged in a matrix on the substrate 2, is formed by developing the thin film 50 of photosensitive resist (refer to FIG. 6C). Thereafter, the electrodes 7 are formed on the upper surfaces of the lamellate structures 3, the bit lines 47, the word line driver 48, and the bit line driver 49 are provided, to complete the information display apparatus 41 illustrated in FIG. 5. The electrodes 7 and the bit lines 47 are produced by forming a mask pattern and a sputtering step.

Note that regarding manufacture of the information display apparatus 41, the shape of the exposure pattern during exposure of the photosensitive resist can be set as desired. Various exposure patterns may be selected according to the intended use of the information display apparatus 41.

FIGS. 7A, 7B, 7C, 7D, 7E, 7F, and 7G show specific examples of other shapes of the upper surfaces of the lamellate structures, and arrangement patterns thereof. Lamellate structures 53a, illustrated in FIG. 7A, have rectangular upper surfaces, and are arranged as one dimensional stripes. Lamellate structures 53b, illustrated in FIG. 7B, have rectangular upper surfaces, and are arranged two dimensionally. Lamellate structures 53c, illustrated in FIG. 7C, have square upper surfaces, and are arranged two dimensionally. Lamellate structures 53d, illustrated in FIG. 7D, have circular upper surfaces, and are arranged in a tetragonal matrix. Lamellate structures 53e, illustrated in FIG. 7E, have circular upper surfaces, and are arranged in a fine density matrix. Lamellate structures 53f, illustrated in FIG. 7F, have hexagonal upper surfaces, and are arranged in a honeycomb. Lamellate structures 53g, illustrated in FIG. 7G, have octagonal upper surfaces, and are arranged in a super honeycomb.

In this manner, information display apparatuses comprising lamellate structures, having upper surfaces of various shapes and arranged in a desired arrangement, are easily formed simply by changing the exposure pattern.

Note that by the arrangement pitch and the period of the walls of the lamellate structures can be formed to correspond to a desired wavelength. In this case, complex spectrum expression and anisotropic color expression (wherein the displayed color changes drastically by varying the viewing direction) can be achieved.

Figure 8A:
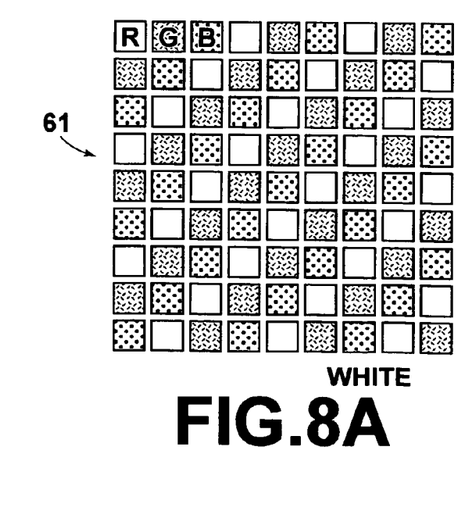
FIGS. 8A and 8B illustrate a single pixel region of an information display apparatus according to a second embodiment of the present invention.
Figure 8B:
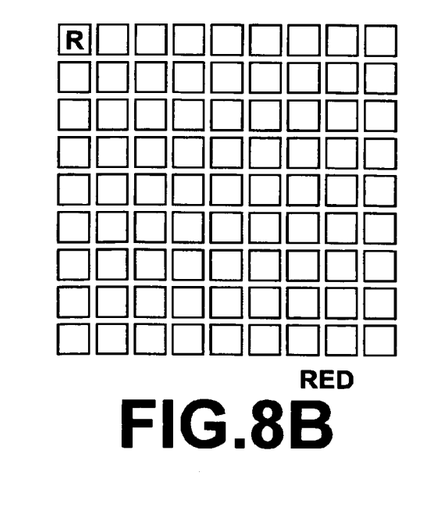

FIGS. 8A and 8B illustrate a portion of an information display apparatus according to a second embodiment of the present invention. Note that a conventional information display apparatus is illustrated in FIGS. 11A and 11B for comparison. FIGS. 8A, 8B, 11A, and 11B all show a region corresponding to one pixel in the respective information display apparatuses. Each pixel is constituted by 81 reflective color display elements 1. Note that FIGS. 8A and 11A show the colors displayed by each element in the case that the pixel illustrated therein displays white, and FIGS. 8B and 11B show the colors displayed by each element in the case the pixel illustrated therein displays red.

The information display apparatus, of which a single pixel 61 is illustrated in FIGS. 8A and 8B, comprises a display portion, which is constituted by a great number of the reflective color display elements 1 arranged in a matrix; and drive means for individually driving each of the elements 1. In the present embodiment, in the case that the pixel 61 is to display white, adjacent elements 1 display different colors. That is, the elements are controlled such that red (R), green (G), and blue (B) are alternately displayed, as illustrated in FIG. 8A. In the case that the pixel 61 is to display red, the elements are controlled such that they all display red, as illustrated in FIG. 8B.

According to the information display apparatus of the present embodiment, all of the elements are each capable of displaying the colors R, G, and B individually. Therefore, control such as that described above is enabled, and color display, which is more vibrant compared to conventional display apparatuses, is enabled.

Figure 9:
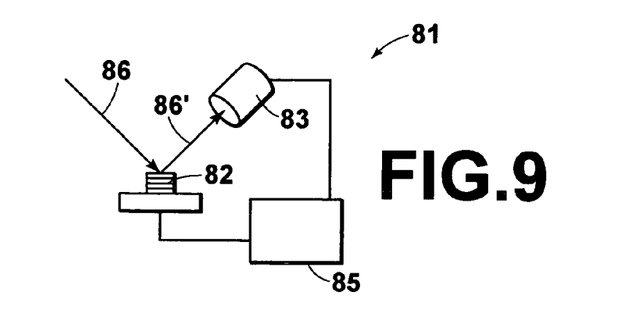
FIG. 9 is a schematic structural diagram of a high frequency electromagnetic wave detecting apparatus.

FIG. 9 is a diagram that illustrates a high frequency electromagnetic wave detecting apparatus 81 equipped with the reflective color display element of the present invention. Here, the reflective color display element is utilized as a reflective electromagnetic wave spatial modulator. Therefore, the reflective color display element will be described as a reflective electromagnetic wave spatial modulating element in the following description.

The high frequency electromagnetic wave detecting apparatus 81 comprises: a reflective electromagnetic wave spatial modulating element 82; a detector 83 for detecting reflected waves, which are reflected by the element 82; and a calculator 85 for varying the voltage applied to the element 82 to change the wavelength of the reflected waves, and for determining the wavelength of an electromagnetic wave irradiated onto the element 82, based on the applied voltage and the detected wavelength.

The structure of the spatial modulating element 82 is approximately the same as the reflective color display element 1 of the first embodiment. However, the thickness of the walls, the intervals therebetween, and the period thereof within the lamellate structure are smaller, compared to a case in which visible light is caused to be interfered with. When producing the lamellate structure, X-ray or electron beam ray resist is employed as the photosensitive resist. Accordingly, exposure is performed with X-rays or an electron beam. In this case as well, standing waves of the X-rays or the electron beam are generated within the resist, in the same manner as the method for manufacturing the reflective color display element of the first embodiment. By developing the resist, a lamellate structure formed by the resist can be formed. By performing exposure with X-rays or an electron beam, the thickness of the walls, the intervals therebetween, and the period thereof can be made smaller than the case in which exposure is performed employing visible light. Thereby, an element that interferes with and reflects high frequency electromagnetic waves, which have shorter wavelengths than visible light, can be formed.

The calculator 85 has the relationships among the wavelengths of incident electromagnetic waves, the voltage applied to the modulating element 82, and the wavelength of the reflected waves stored therein in advance.

In the high frequency electromagnetic wave detecting apparatus 81, high frequency electromagnetic waves 86, of which the wavelengths are unknown, are caused to enter the reflective electromagnetic wave spatial modulating element 82. The voltage applied to the modulating element 82 is varied while the high frequency electromagnetic waves 86 are incident thereon. The detector 83 detects the wavelength of the waves 86' reflected by the modulating element 82. Thereafter, the calculator 85 determines the wavelength (frequency) of the incident high frequency electromagnetic waves 86, based on the wavelength of the reflected waves 86'.

Hereinafter, other uses of lamellate structures, which are formed by standing waves generated within photosensitive resist when irradiated by exposure light, will be described.

Figure 10:
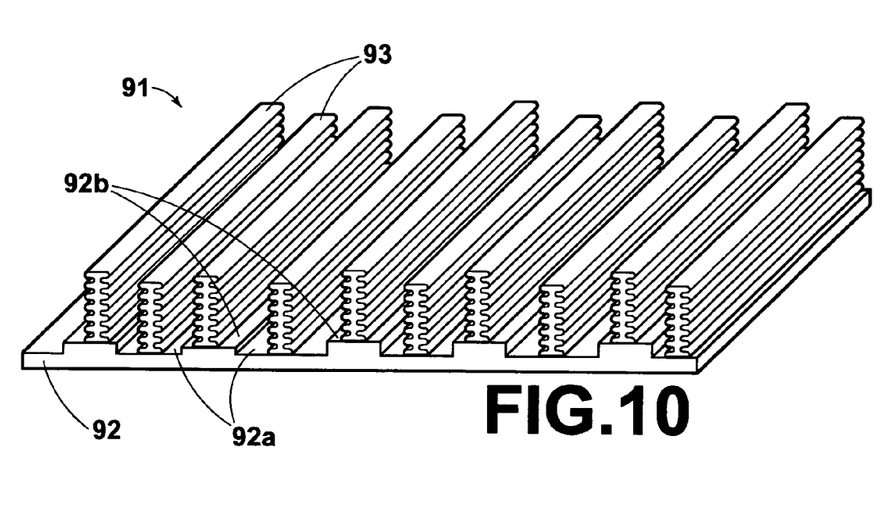
FIG. 10 is a perspective view of a color display that utilizes lamellate structures, which are formed by photosensitive resist.

FIG. 10 is a perspective view of a color display 91 that utilizes lamellate structures, which are formed by photosensitive resist. The color display 91 comprises: a substrate 92, which has recessed portions 92a and protruding portions 92b that extend as stripes on the surface thereof; and lamellate structures 93, which are provided within the recessed portions 92a and the protruding portions 92b and extend as stripes. The difference in height between the recessed portions 92a and the protruding portions 92b is less than or equal to a period of the walls of the lamellate structures 93.

The construction of the color display 91 enables anisotropic color expression, as exhibited by morpho butterflies, which are famous for exhibiting structural colors.

The method for manufacturing the color display 91 will be described.

A thin film of photosensitive resist is formed on the substrate 92, having the recessed portions 92a and the protruding portions 92b that extend as stripes on the surface thereof. Note that the surface of the substrate 92 is a reflective surface. Thereafter, patterned exposure is performed in stripes. Standing waves are generated between the surface of the thin film of photosensitive resist and the surface of the substrate 92, thereby forming lamellate exposed portions within the photosensitive resist. Thereafter, the photosensitive resist is developed, to form lamellate structures formed by the photosensitive resist that extend as stripes on the substrate 92.

Note that more complex spectrum expression and color expression would be enabled by employing various upper surface shapes and arrangements, such as those illustrated in FIGS. 7A, 7B, 7C, 7D, 7E, 7F, and 7G, instead of the one dimensional stripe arrangement. Further, voltage applying means, such as those employed in the reflective color display elements of the first embodiment, may be provided at both ends of the lamellate structures 93 of the color display 91 illustrated in FIG. 10. Thereby, the period of the walls can be varied by the application of voltage, which would enable display of desired colors.

What is claimed is:

1. A reflective color display element, comprising:
   a lamellate structure, formed by a piezoelectric material that expands and contracts by the application of voltage thereto; and
   a voltage applying means, for applying voltage to the lamellate structure at both ends in the expansion/contraction direction thereof; wherein
   the color exhibited by the lamellate structure is varied by adjusting the voltage applied to the lamellate structure, thereby causing the lamellate structure to expand and contract, by which interference wavelengths of light incident on the lamellate structure, having a component in the expansion/contraction direction, within the lamellate structure is varied.

2. A reflective color display element, comprising:
   a lamellate structure, formed by a photosensitive resist material; and
   a filler portion, formed by a piezoelectric material that expands and contracts by the application of voltage thereto, which is embedded between the walls and in the periphery of the lamellate structure; wherein
   the color exhibited by the lamellate structure is varied by adjusting the voltage applied to the filler portion, thereby causing the lamellate structure to expand and contract, by which interference wavelengths of light incident on the lamellate structure, having a component in the expansion/contraction direction, within the lamellate structure is varied.

3. A method for manufacturing a reflective color display element, comprising the steps of:
   irradiating exposure light in a substantially vertical direction onto a photosensitive resist film, which is provided on a reflective surface of a substrate, to generate standing waves of the exposure light between the surface of the resist film and the reflective surface, thereby exposing the interior of the resist film with the exposure light;
   developing the photosensitive resist film, to form lamellate structures from the exposed portion or portions that are not exposed; and
   providing means for applying voltage to both ends of the lamellate structures in their expansion/contraction direction.

4. A method for manufacturing a reflective color display element, comprising the steps of:
   irradiating exposure light in a substantially vertical direction onto a photosensitive resist film, which is provided on a reflective surface of a substrate, to generate standing waves of the exposure light between the surface of the resist film and the reflective surface, thereby exposing the interior of the resist film with the exposure light;
   developing the photosensitive resist film, to form lamellate structures from the exposed portion or portions that are not exposed;
   embedding piezoelectric material between the walls and in the peripheries of the lamellate structures; and
   providing means for applying voltage to both ends of the lamellate structures in their expansion/contraction direction.

5. An information display apparatus, comprising:
   a display portion, constituted by a great number of the reflective color display elements as defined in claim 1 arranged in a matrix; and
   drive means, for driving each of the elements so that a plurality of adjacent elements constitute a single pixel.

6. An information display apparatus, comprising:
   a display portion, constituted by a great number of the reflective color display elements as defined in claim 2 arranged in a matrix; and
   drive means, for driving each of the elements so that a plurality of adjacent elements constitute a single pixel.

* * * * *